7/30/85   XR   4,532,162

United States Patent [19]
Neece

[11] Patent Number: 4,532,162
[45] Date of Patent: Jul. 30, 1985

[54] CAR RADIO AND STEREO PROTECTOR

[76] Inventor: Thomas B. Neece, 14 Wilder St., San Francisco, Calif. 94131

[21] Appl. No.: 489,854

[22] Filed: Apr. 29, 1983

[51] Int. Cl.³ .............................................. F41H 3/00
[52] U.S. Cl. .................................... 428/31; 248/27.1; 428/100; 428/919; 455/345; 455/347
[58] Field of Search .......................... 428/31, 100, 919; 455/345, 347; 180/90; 280/752; 296/37.12, 70; 248/27.1, 915; 2/DIG. 6

[56]   References Cited
U.S. PATENT DOCUMENTS

| | | | |
|---|---|---|---|
| 3,423,276 | 1/1969 | Eckenroth | 428/31 X |
| 3,751,100 | 8/1973 | Keyes | 428/31 X |
| 3,830,334 | 8/1974 | Costa | 428/31 X |
| 4,280,226 | 7/1981 | Jenkins | 455/345 |
| 4,365,280 | 12/1982 | Crosetti et al. | 428/919 X |

OTHER PUBLICATIONS

"And Did It With Velcro", Sep. 1972.
Velcro Product News, Oct. 1977, PN No. 38.

Primary Examiner—Henry F. Epstein
Attorney, Agent, or Firm—Flehr, Hohbach, Test, Albritton & Herbert

[57]   ABSTRACT

Protective device for preventing the theft of radios, tape decks and other appliances from unattended vehicles by concealing the presence of the appliance from view by a thief looking through a window of the vehicle.

9 Claims, 3 Drawing Figures

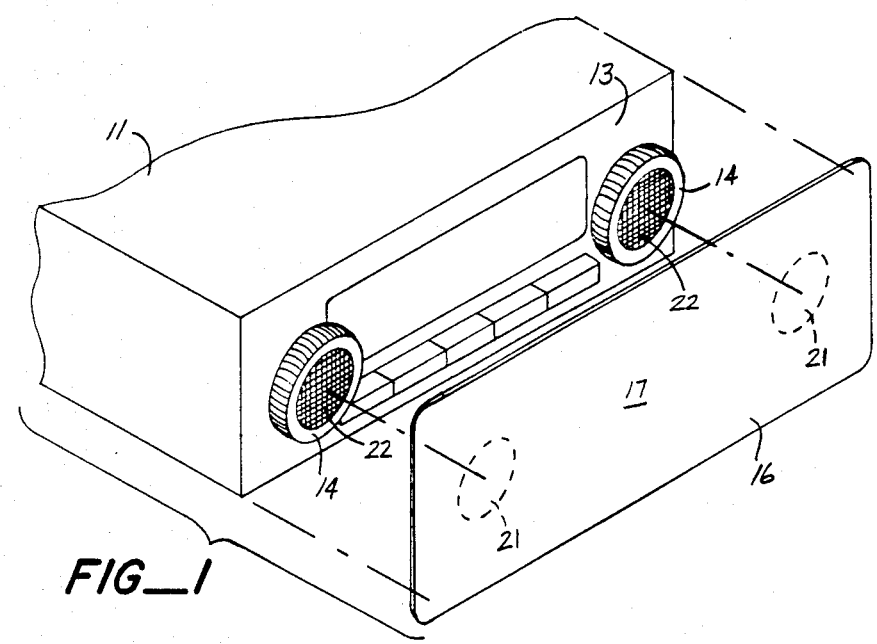
FIG_1
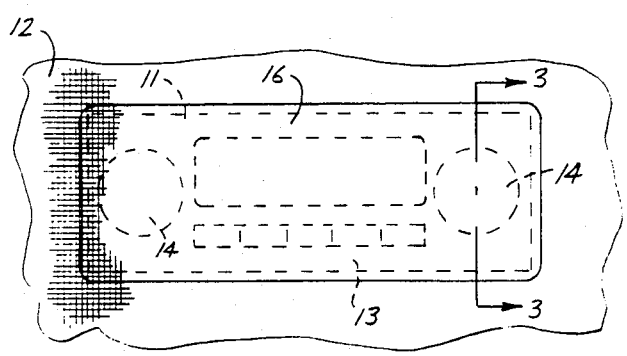
FIG_2
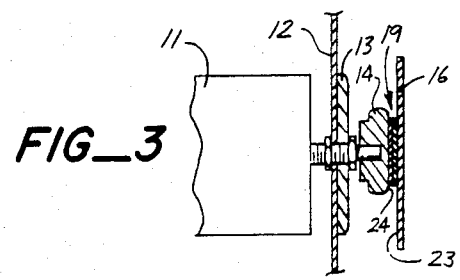
FIG_3

CAR RADIO AND STEREO PROTECTOR

This invention pertains to apparatus for preventing the theft of radios, tape decks and the like from automobiles and other vehicles.

In recent years, there has been an increase in the theft of appliances such as stereophonic radios and tape decks from automobiles, and other vehicles. In a typical situation, it is believed that the thief spots the applicance through the window of an unoccupied vehicle, breaks the window to gain access to the passenger compartment, then removes the radio from the dashboard or console in which it is mounted. The thief operates as quickly as possible, frequently using force to remove the radio, and the owner usually suffers damage to his vehicle as well as the loss of the radio.

It is in general an object of the invention to provide a new and improved protective device for preventing the theft of radios, tape decks and the like from automobiles and other vehicles.

Another object of the invention is to provide a protective device of the above character which is easy to install and can be readily installed and removed by the vehicle owner.

Another object of the invention is to provide a protective device of the above character which is economical to manufacture.

These and other objects are achieved in accordance with the invention by providing a protective panel having a visual appearance similar to the dash area in which the radio or other appliance is mounted. The protective panel is removably mounted in front of the radio and blends visually with the surrounding dash area to conceal the presence of the radio from a thief looking into the passenger compartment through a window. The panel is secured to the control knobs of the radio by releasable fasteners which permit the panel to be easily installed and removed.

BRIEF DESCRIPTION OF THE DRAWINGS

FIG. 1 is an exploded isometric view of one embodiment of an automobile radio with a protective device according to the invention.

FIG. 2 is a fragmentary front elevational view of the embodiment of FIG. 1, illustrating the manner in which the protective device blends visually with the surrounding dash area and conceals the radio.

FIG. 3 is a cross-sectional view taken along line 3—3 in FIG. 2.

DETAILED DESCRIPTION

In the drawings the invention is illustrated in connection with a radio 11 mounted in the dash area 12 of a vehicle (not shown) such as an automobile. As used hereinafter, the term radio includes not only AM and FM radios of the type most commonly found in automobiles, but all types of radio equipment, stereophonic sound equipment and other appliances mounted in the dash areas of automobiles. The term dash area includes the dashboard itself, floor mounted consoles and other suitable mounting areas in the passenger compartment of the vehicle.

In the embodiment illustrated, radio 11 has a generally rectangular front panel or escutcheon 13 with control knobs 14 projecting therefrom. It will be understood, however, that the radio can be of any desired size and shape and that it can have any desired arrangement of controls.

The protective device comprises a generally planar panel 16 of somewhat greater lateral extent (height and width) than the front panel of the radio, and in the embodiment illustrated, the protective panel comprises a generally rectangular plate with rounded corners. The front side 17 of the protective plate has a visual appearance similar to the dash area around the radio, and when the panel is positioned in front of the radio, it covers the radio from direct view and blends visually with the surrounding dash area to conceal the presence of the radio. In one presently preferred embodiment, the protective panel is fabricated of plastic, and it has a color and texture similar to the color and texture of the dash panel. If the dash is covered with vinyl or another fabric, panel 16 can be covered with a similar fabric.

Panel 16 is removably mounted in front of radio 11 in spaced parallel relation to front panel 13 and is releasably secured to knobs 14 by fasteners 19. In the embodiment illustrated, these fasteners are hook and pile fasteners having male and female parts 21, 22 affixed respectively to the backside 23 of the panel and to the front faces 24 of control knobs 14. The fastener parts are secured to the panel and knobs by suitable means such as an adhesive, and in one presently preferred embodiment the fastener parts have an adhesive backing covered with a layer of protective material which is removed to expose the adhesive when the device is installed. In the embodiment illustrated, the fastener parts are in the form of circular disks having a diameter somewhat less than the diameter of the knobs on which they are mounted. The female parts of the fasteners are preferably mounted on the knobs since they are somewhat softer to the touch than the male parts. If desired, the female parts can be colored to match or coordinate with the color of the knobs.

One or more additional female fastener parts (not shown) can be mounted in a convenient location such as the underside of the dash to provide means for holding the protective panel when it is not in use.

Operation and use of the protective device is as follows. In a preferred method of installing the device initially, the mated fastener parts are mounted on the front sides of the radio knobs, with the female parts being bonded to the knobs and the adhesive on the backside of the male parts facing in an outward direction. Panel 16 is then held in the desired position in front of the radio and pressed against the exposed adhesive to bond the male fastener parts to the backside of the panel in the proper positions. When the adhesive has set, the protective panel can be removed and installed as desired, with the female fastener parts remaining on the knobs and the male fastener parts remaining on the backside of the panel.

When the vehicle is to be left unattended, the panel is installed in the protective position in front of the radio. With the protective panel installed, the radio is substantially concealed from view by a person looking into the passenger compartment through the windows of the car. This effectively protects the radio since thieves are not likely to take the risk of breaking into a vehicle to steal a radio which they cannot see.

When the vehicle is occupied and the radio is to be used, the protective panel is removed by pulling it away from the radio to separate the fastener parts. While removed, the panel can be stored in a convenient location such as in the glove compartment or on additional fasteners under the dash. It is reinstalled simply by positioning the panel in front of the radio again and pressing the fastener parts together.

The invention has a number of important features and advantages. It provides an inexpensive and effective method of protecting automobile radios and the like from theft. It is economical to manufacture and easy to install and use.

It is apparent from the foregoing that a new and improved protective device for automobile radios and the like has been provided. While only one presently preferred embodiment has been described in detail, as will be apparent to those familiar with the art, certain changes and modifications can be made without departing from the scope of the invention as defined by the following claims.

I claim:

1. A protective device for preventing theft of a normally visible radio from the dash area of a vehicle, said radio having a front panel with control knobs projecting therefrom, comprising a generally planar protective panel having a front surface similar in appearance to the dash area around the radio, and means on the back side of the protective panel for removably securing the protective panel to the front portions of the control knobs with the protective panel being positioned in front of the radio in closely spaced parallel relation to the front panel of the radio to at least partially conceal the radio from view, with the surface of the protective panel blending visually with the surrounding area of the dash to conceal the presence of the radio.

2. The protective device of claim 1 wherein the protective panel is removably attached to the control knobs by fasteners having first and second separable mating parts affixed respectively to the protective panel and to the control knobs.

3. The protective device of claim 2 wherein the first parts of the fasteners are affixed to the backside of the protective panel, and the second parts of the fasteners are affixed to the front faces of the control knobs.

4. The protective device of claim 1 wherein the means for removably securing the protective panel to the control knobs comprises hook and pile fasteners.

5. The protective device of claim 1 wherein the protective panel comprises a generally planar plate of rigid material.

6. In combination: a radio mounted in the dash area of a vehicle and having control knobs projecting therefrom, a protective panel positioned in front of the radio and at least partially concealing the radio from view, and means releasably securing the protective panel to the control knobs of the radio and permitting ready removal of the panel from in front of the radio when the radio is in use, the protective panel blending visually with the dash area around the radio and thereby concealing the presence of the radio.

7. The combination of claim 6 wherein the means securing the protective panel to the control knobs includes hook and pile fasteners having mating parts secured to the backside of the panel and to the front surfaces of the knobs.

8. In combination: a radio mounted in a normally visible position in the dash area of a vehicle and having control knobs projecting therefrom, a protective panel positioned in front of the radio and at least partially concealing the radio from view, said protective panel having a visual appearance similar to the dash area around the radio, and hook and pile fasteners having separable mating parts affixed to the backside of the protective panel and to the front portions of the control knobs to releasably secure the panel to the knobs.

9. The combination of claim 8 wherein the protective panel comprises a generally rectangular plate of rigid material.

* * * * *